(12) United States Patent
Kikusato

(10) Patent No.: US 7,434,815 B2
(45) Date of Patent: Oct. 14, 2008

(54) STAIR CLIMBING WHEELCHAIR CARRIER

(75) Inventor: Tsutomu Kikusato, Saitama-ken (JP)

(73) Assignee: Sunwa Ltd., Sayama-shi, Saitama-ken (JP)

( * ) Notice: Subject to any disclaimer, the term of this patent is extended or adjusted under 35 U.S.C. 154(b) by 356 days.

(21) Appl. No.: 11/245,017

(22) Filed: Oct. 7, 2005

(65) Prior Publication Data

US 2006/0076739 A1    Apr. 13, 2006

(30) Foreign Application Priority Data

Oct. 8, 2004    (JP) .............................. 2004-296305

(51) Int. Cl.
*B62B 5/02*    (2006.01)

(52) U.S. Cl. .............................. 280/5.22; 280/DIG. 10; 180/8.2; 180/8.3

(58) Field of Classification Search ................ 280/5.22, 280/DIG. 10; 180/8.2, 8.3
See application file for complete search history.

(56) References Cited

U.S. PATENT DOCUMENTS

| | | | | |
|---|---|---|---|---|
| 4,564,080 A | * | 1/1986 | Pagett ........................ | 180/8.2 |
| 4,566,706 A | * | 1/1986 | Bihler et al. ................ | 280/5.22 |
| 4,687,068 A | * | 8/1987 | Pagett ........................ | 180/8.2 |
| 4,771,839 A | * | 9/1988 | Misawa ...................... | 180/8.2 |
| 4,898,256 A | * | 2/1990 | Lehner ....................... | 180/8.2 |
| 5,197,558 A | * | 3/1993 | Misawa ...................... | 180/8.2 |
| 6,158,536 A | * | 12/2000 | Misawa ..................... | 180/9.32 |
| 6,805,209 B2 | * | 10/2004 | Hedeen ..................... | 180/9.32 |
| 6,857,490 B2 | * | 2/2005 | Quigg ....................... | 180/9.28 |

FOREIGN PATENT DOCUMENTS

| JP | 64-7914 | 2/1989 |
|---|---|---|
| JP | 2592669 | 12/1996 |

* cited by examiner

*Primary Examiner*—Lesley D. Morris
*Assistant Examiner*—Marlon A Arce Diaz
(74) *Attorney, Agent, or Firm*—McGinn IP Law Group, PLLC

(57) ABSTRACT

A stair climbing wheelchair carrier operable by an unassisted wheelchair user is provided. The carrier includes a crawler drive unit and a carrying unit. The carrying unit includes a carrier main frame whose position is adjustable up and down relative to the crawler drive unit, an anchor unit for securely holding the back of the wheelchair set in a wheelchair mounting position on the carrier main frame, and a holding and moving unit for holding the wheelchair on the ground in the front part of the crawler drive unit and for moving the wheelchair to the wheelchair mounting position that is in the rear part of the crawler drive unit as the wheelchair user tilts the wheelchair backward by shifting the body weight. This stair climbing wheelchair carrier allows even a wheelchair with a relatively short front to back length to be mounted in the rear part of the carrier for stable transport up and down stairs.

7 Claims, 8 Drawing Sheets

STAIR CLIMBING WHEELCHAIR CARRIER

BACKGROUND OF THE INVENTION

The present invention relates to a stair climbing wheelchair carrier designed to transport wheelchair users up and down stairs, and more particularly to a carrier that can be set and operated by the wheelchair users themselves.

A stair climbing wheelchair carrier shown, for example, in Japanese Examined Patent Publication No. Sho 64-7914 includes a motor-driven crawler device that travels up and down stairs, on which a front-facing wheelchair with a user on it is carried in a tilted back position. This carrier does not allow the wheelchair user to set the wheelchair on the carrier without help from an operator or an assistant. This is against the recent trend of putting more weight on providing barrier free access to wheelchair users. Also, wheelchair users often have no physical impediments other than the walking disability. Therefore, a stair climbing wheelchair carrier which an unassisted wheelchair user can use as the user rests on the wheelchair needs to be developed.

Japanese Patent No. 2592669 shows a technique developed in response to this demand. Referring to FIG. 1A to FIG. 1C, this conventional wheelchair carrier includes a crawler drive unit J2 and a carrying unit J3. J1 represents a wheelchair. The crawler drive unit J2 drives crawler belts J20 with a motor to travel up and down stairs. The carrying unit J3 includes a support frame J30 for supporting the wheelchair J1 in a tilted back position, and anchoring hooks J31 that can engage with the back of the wheelchair J1 supported on the frame. The carrying unit J3 can be moved up and down relative to the crawler drive unit J2 by a lift mechanism J4. Male couplers J32 are pivoted on cross shafts J32a in the lower part of the support frame J30 of the carrying unit J3. To the cross shafts J32a are securely attached levers J32b which rotate with the male couplers J32. The levers J32b are connected to sliders J32d on guide bars J33 of the carrying unit J3 via connection rods J32c. The sliders J32d slide along the guide bars J33 with the rotation of the male couplers J32 relative to the support frame J30, to move cams J32e.

To mount the wheelchair J1 on the carrying unit J3, the wheelchair J1 is moved backward from the state shown in FIG. 1A until the male couplers J32 mate with female couplers J11 formed on the wheelchair J1. The user (not shown) on the wheelchair J1 then holds a hand grip on the side of the support frame J30 and shifts the body weight to tilt the wheelchair J1 backwards until the wheelchair J1 touches the support frame J30. The wheelchair user then locks the backside of the wheelchair J1 on the support frame J30 with the anchoring hooks J31.

As the wheelchair J1 inclines backwards, the male couplers J32 rotate upward as shown in FIG. 1B, causing the sliders J32d and the cams J32e to slide on the guide bars J33. The cams J32e thereby rotate levers J21 attached to the crawler drive unit J2, causing a support wheel J23, which is pivoted on the same shaft as that of the levers J21, to make contact with the ground.

The user on the wheelchair J1 then operates a lever J41 of the lift mechanism J4 to lower the carrying unit J3 relative to the crawler drive unit J2 so that the crawler drive unit J2 is lifted up and the wheels J10 of the wheelchair J1 and the support wheel J23 make contact with the ground as shown in FIG. 1B to allow wheelchair movement.

When climbing up or down stairs with the crawler drive unit J2, the wheelchair user operates the lever J41 of the lift mechanism J4 to raise the carrying unit J3 relative to the crawler drive unit J2 so that the crawler drive unit J2 makes contact with the ground. When the carrying unit J3 is lifted up, the cams J32e are freed from the levers J21 and the support wheel J23 is retracted to a position inside the crawler drive unit J2. The support wheel J23 is biased toward this retracted position. In this state, the crawler drive unit J2 is moved along the corners of the stairs K to climb up or down the stairs as shown in FIG. 1C.

This wheelchair carrier allows the wheelchair user to set the wheelchair J1 on the carrying unit J3 as the user remains on the wheelchair. Also, as the crawler drive unit J2 can be lifted up to bring the wheels J10 of the wheelchair J1 in contact with the ground, the user can move the wheelchair, for example, for making a small turn in a landing between the stairs, without an assistant.

With this structure of the conventional technique, the left and right wheels J10 of the wheelchair J1 bridge across the crawler drive unit J2 when the wheelchair J1 is mounted on the carrying unit J3, and therefore, when the wheelchair J1 is moved back from the state shown in FIG. 1A to be connected to the carrying unit J3, the coupling between the female couplers J11 and the male couplers J32 must be complete before the foot rest J12 (see FIG. 1A) of the wheelchair J1 touches the front end of the crawler drive unit J2. Meanwhile, since the front side of the crawler drive unit J2 always faces downwards during stair ascent and descent as shown in FIG. 1C, the carrying unit J3 must be located more backward of the center of gravity of the crawler drive unit J2 for stable movement on the stairs. This requires the wheelchair J1 to have more than a certain front to back length L (see FIG. 1A) to be connectable to the carrying unit J3 that is at the back of the crawler drive unit J2. However, athletic wheelchair users who have no physical impediments other than the walking disability tend to use wheelchairs with a small front to back length L for quick movability. Such small wheelchairs cannot be connected to the carrying unit J3 at the back of the crawler drive unit J2. The front to back length of the crawler drive unit could be shortened to solve this problem, but the stability during stair ascent and descent will then be sacrificed.

SUMMARY OF THE INVENTION

An object of the present invention is to solve these problems in the conventional stair climbing wheelchair carrier and to provide a carrier with improved safety and operability. More specifically, the present invention aims to provide a stair climbing wheelchair carrier which can hold wheelchairs with a short front to back length in a rear position of the carrier to climb up or down stairs stably, and which allows a user sitting on the wheelchair to set the wheelchair on the carrier and to move the wheelchair on the ground to make a small turn or the like without any help from anyone.

To achieve the above object, the present invention provides a stair climbing wheelchair carrier having the following characteristic features:

A stair climbing wheelchair carrier according to a first aspect of the present invention includes: a crawler drive unit with a motor-driven crawler device that travels up and down stairs; and a carrying unit on which a front-facing wheelchair with a user on it is mounted in a tilted back position. The carrying unit includes: a carrier main frame whose position is adjustable up and down relative to the crawler drive unit; anchor means for securely holding the back of the wheelchair set in a wheelchair mounting position on the carrier main frame; and holding and moving means for holding the wheelchair on the ground in the front part of the crawler drive unit and for moving the wheelchair to the wheelchair mounting position that is in the rear part of the crawler drive unit as the wheelchair user tilts the wheelchair backward by shifting the body weight.

In addition to the above first aspect, according to a second aspect, the carrier main frame is connected to the crawler drive unit via a position adjustment device, so that the relative positions of the carrying unit and the crawler drive unit are changeable through operation of the position adjustment device: They can be positioned in an intermediate position where the wheelchair is coupled to and removed from the holding and moving means, a stair climbing position where the crawler drive unit can travel up or down stairs with the wheelchair set on the carrying unit, and a wheelchair moving position where the wheels of the wheelchair on the carrying unit make contact with the ground and the crawler drive unit is lifted up. In the rear part of the crawler drive unit is installed an anti-tip wheel that extends and retracts with the movement of the position adjustment device and makes contact with the ground when the crawler drive unit is in the wheelchair moving position.

According to a third aspect of the present invention, the position adjustment device is a power cylinder device that can extend and retract in up and down directions, and the upper limit position and the lower limit position of the power cylinder device correspond to the stair climbing position and the wheelchair moving position, respectively.

In addition to the foregoing aspects, according to a fourth aspect of the present invention, the holding and moving means includes: a projecting holder protruding forward to fit into a female coupler on the wheelchair; a slider mounted on the carrier main frame such as to be slidable back and forth, the base part of the projecting holder being pivoted to the distal end of the slider; and a linkage mechanism that changes the angle of the projecting holder as the slider slides back and forth for directing the projecting holder horizontally at the front end position of the slider, and diagonally upwards at the rear end position.

In addition to the foregoing aspects, according to a fifth aspect of the present invention, the linkage mechanism includes: a first link unit end of which is pivoted to the carrier main frame and the other end of which is a moving end; a second link unit end of which is pivoted to the moving end of the first link and the other end of which is pivoted to the slider; and a third link unit end of which is pivoted in the center of the second link and the other end of which is pivoted to the rotating end of the base part of the projecting holder.

In addition to the foregoing aspects, according to a sixth aspect of the present invention, the projecting holder is provided with a locking mechanism for retaining the female coupler on the wheelchair, and the locking mechanism has a locking claw which engages with the female coupler when the projecting holder is directed diagonally upwards and releases the female coupler when the projecting holder is horizontal.

In addition to the foregoing aspects, according to a seventh aspect of the present invention, when the carrying unit and the crawler drive unit are in their stair climbing positions, the slider is retained in its rear end position and cannot move forward.

In addition to the foregoing aspects, according to an eighth aspect of the present invention, the anchor means has a mechanism that allows release thereof only when the carrying unit and the crawler drive unit are in their intermediate positions.

This stair climbing wheelchair carrier can hold wheelchairs with a short front to back length in a rear position of the carrier to climb up or down stairs stably, and allows a wheelchair user to set the wheelchair on the carrier and to move the wheelchair on the ground to make a small turn or the like without any help from anyone. Thus the stair climbing wheelchair carrier of the present invention offers improved safety and operability.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

Figure 1A:
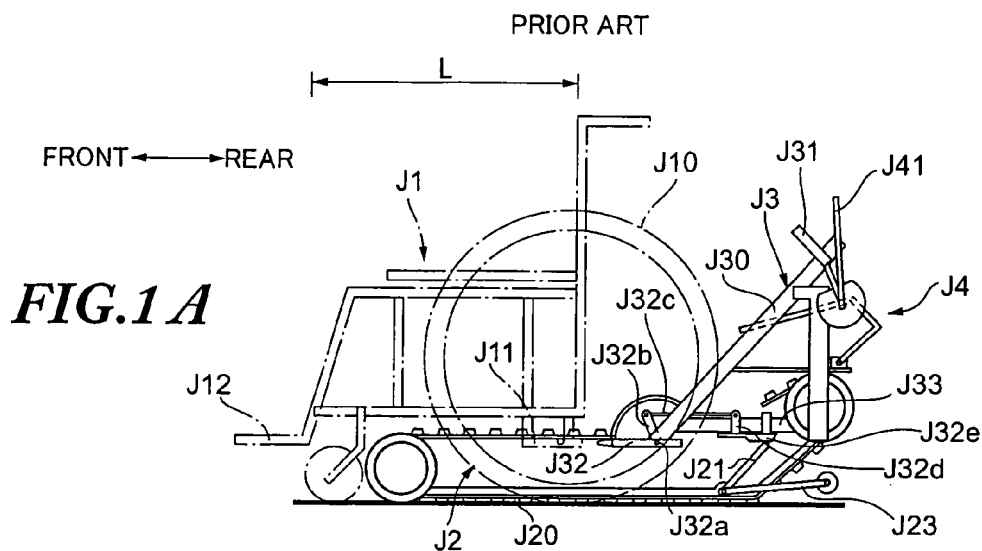
FIG. 1A to FIG. 1C are diagrams for explaining conventional techniques.
Figure 1B:
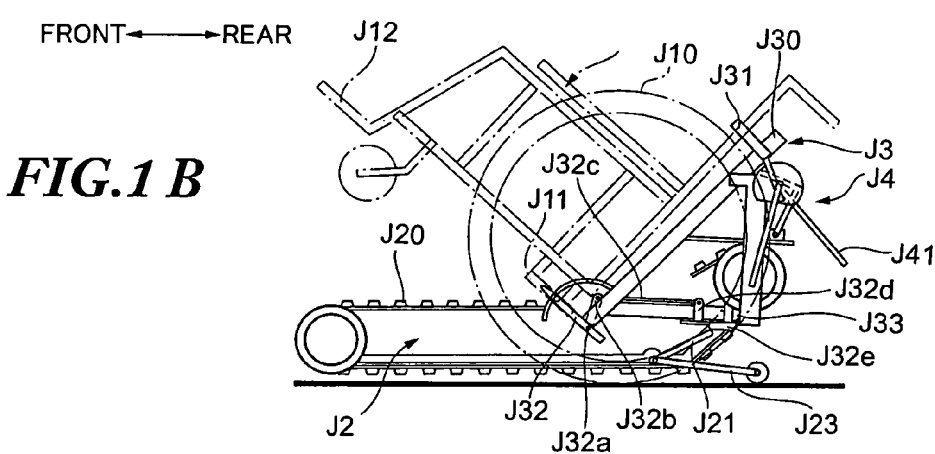
Figure 1C:
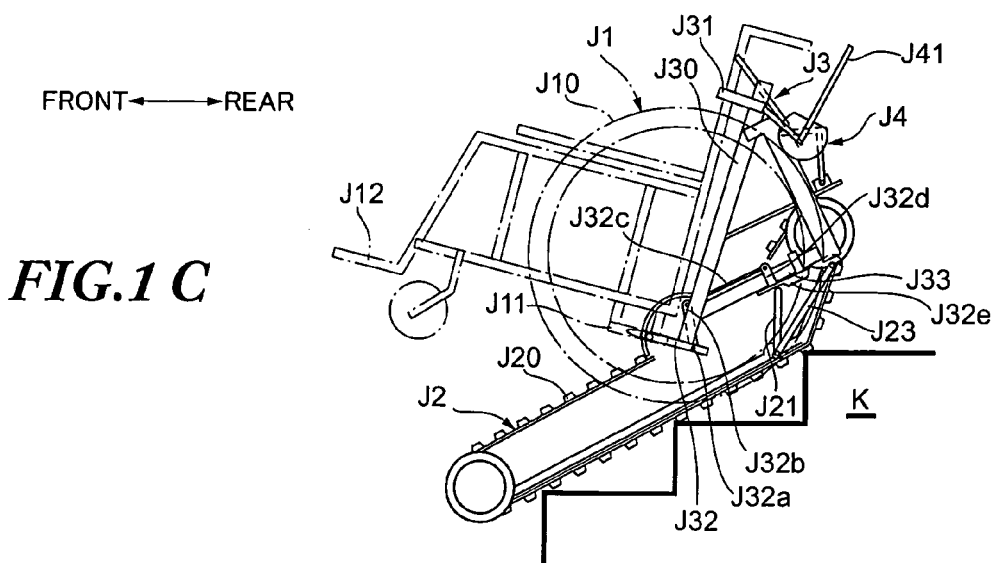
Figure 2:
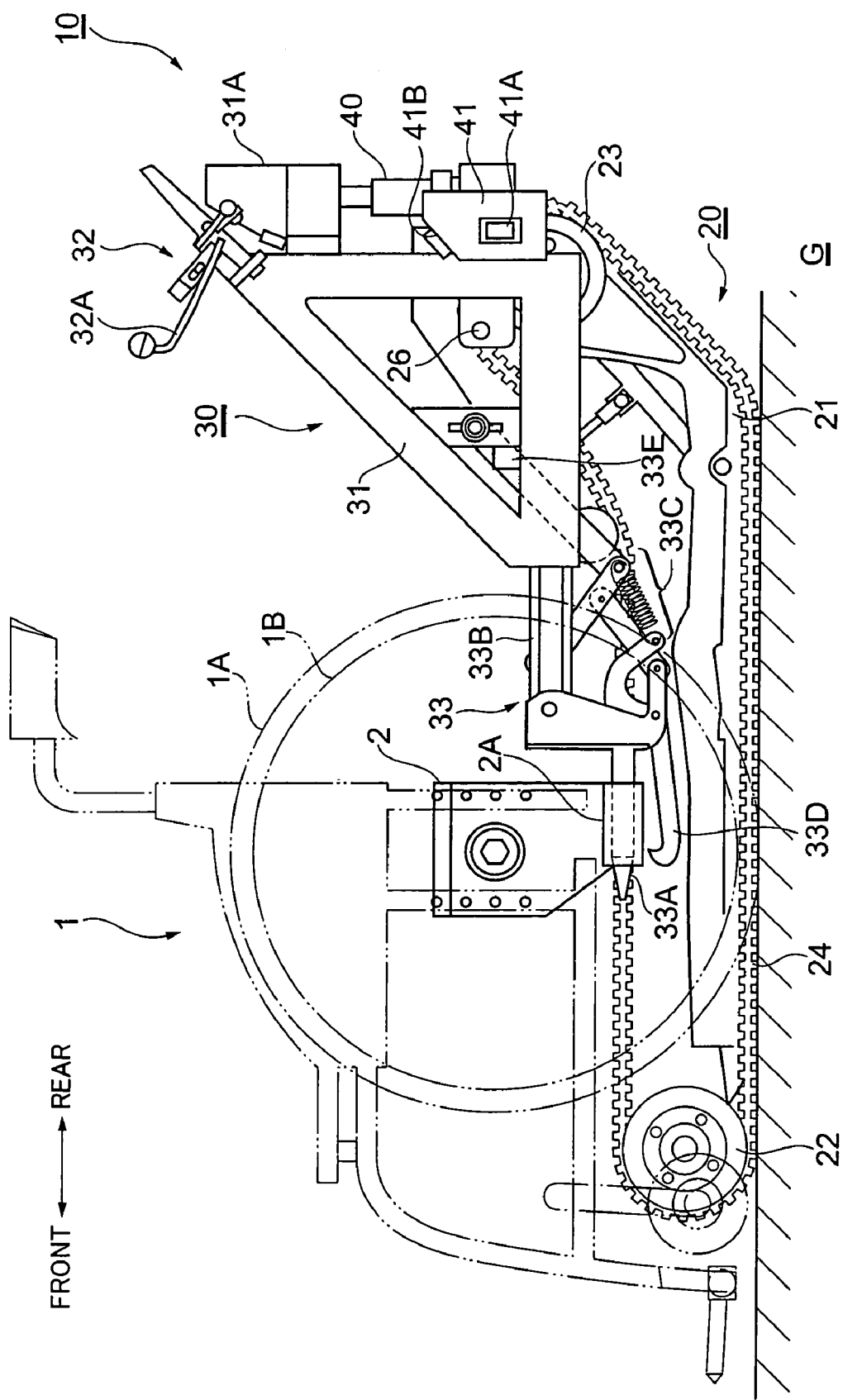
FIG. 2 illustrates the overall structure of one embodiment of a stair climbing wheelchair carrier of the present invention given in explanation of its functions.
Figure 3:
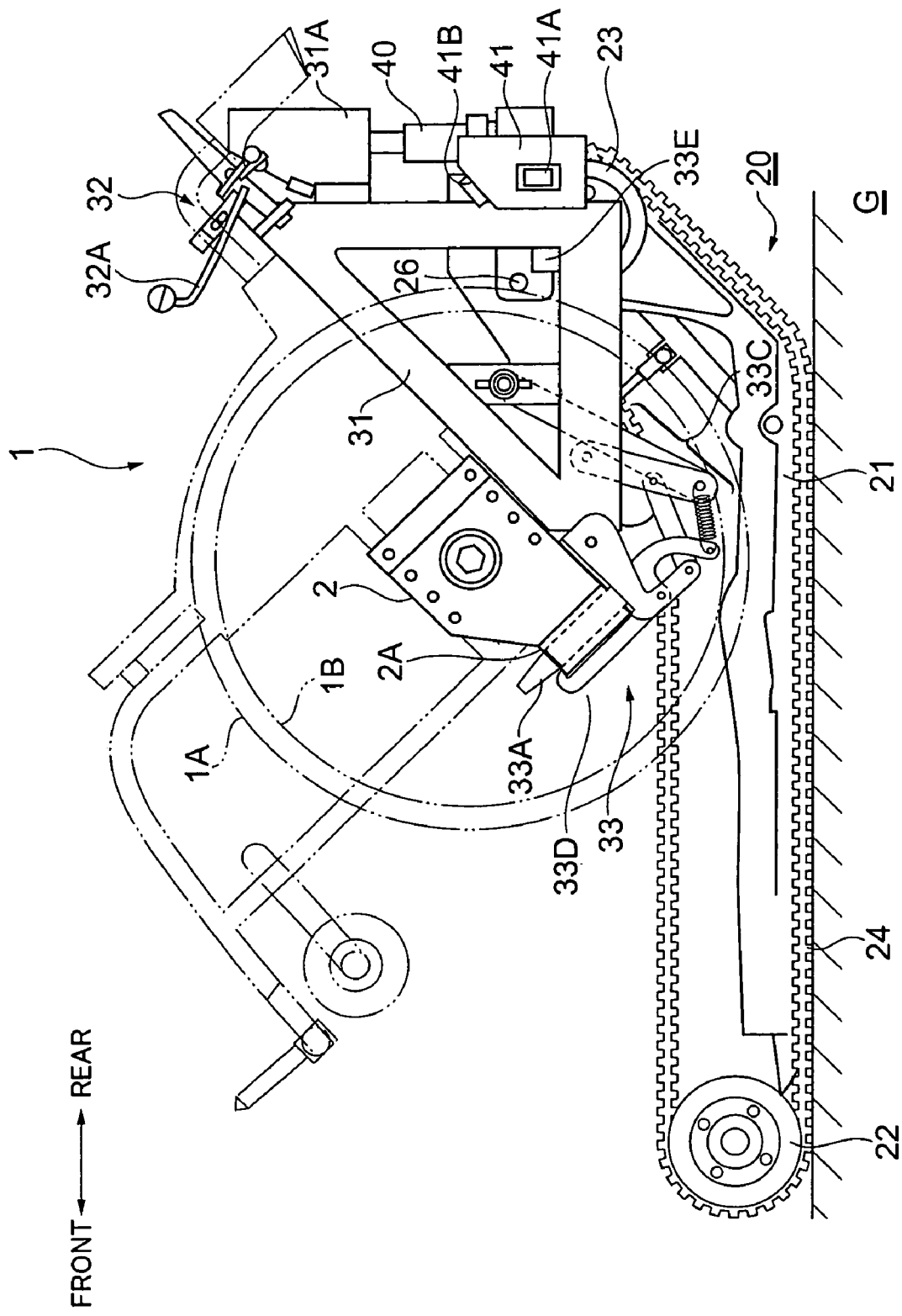
FIG. 3 illustrates the overall structure of the stair climbing wheelchair carrier given in explanation of its functions.
Figure 4:
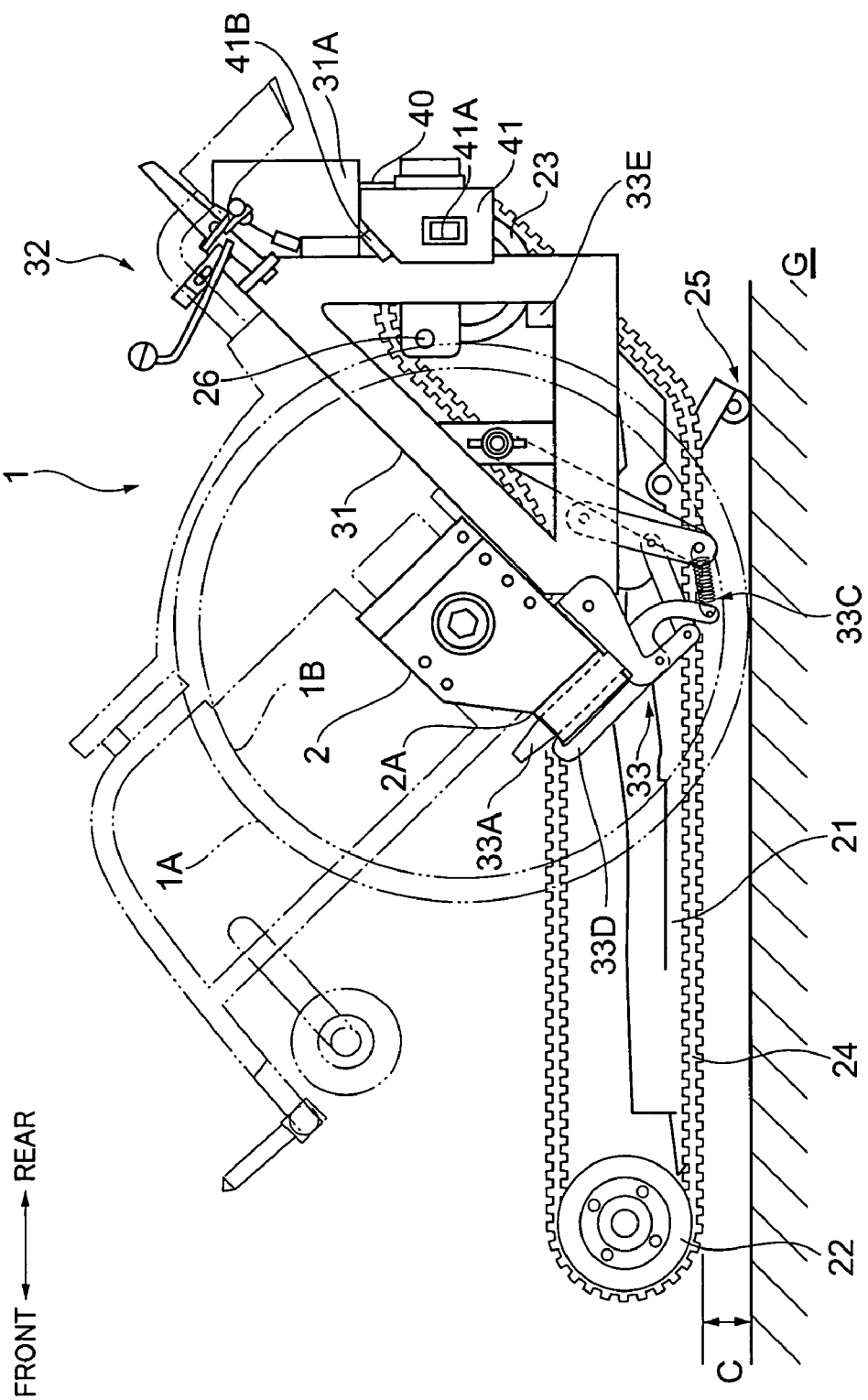
FIG. 4 illustrates the overall structure of the stair climbing wheelchair carrier given in explanation of its functions.

FIG. 2 to FIG. 4 illustrate the overall structure of one embodiment of a stair climbing wheelchair carrier of the present invention given in explanation of its functions. Same elements are given the same reference numerals in the drawings and description thereof will not be repeated for each of the drawings.

The stair climbing wheelchair carrier 10 is designed to transport a wheelchair 1 with a user on it up or down stairs and is mainly composed of a crawler drive unit 20 and a carrying unit 30. It should be noted that "front" and "back" or "rear" in the following description and the claims refer to the direction of the wheelchair on the carrier.

The crawler drive unit 20 includes a motor-driven crawler device that travels up and down stairs and has a basic structure that is conventionally known: A frame (not shown), guide rails 21 provided on the frame, the rear ends of the rails being raised at a predetermined angle, drive wheels 22 and driven wheels 23 pivoted to the frame, crawler belts 24 trained around the drive wheels 22 and the driven wheels 23, a motor (not shown) for driving the drive wheels 22, a battery device (not shown) for supplying power to the motor, and a retractable anti-tip wheel 25 provided in the rear part.

The carrying unit 30 receives a front-facing wheelchair 1 with a user (not shown) on it in a tilted back position. The carrying unit 30 includes: a carrier mainframe 31 whose position is adjustable up and down relative to the crawler drive unit 20; anchor means 32 for securely holding the back of the wheelchair 1 set in a wheelchair mounting position on the carrier main frame 31; and holding and moving means 33 for holding the wheelchair 1 on the ground in the front part of the crawler drive unit 20 and for moving the wheelchair 1 to the wheelchair mounting position that is in the rear part of the crawler drive unit 20 as the wheelchair user tilts the wheelchair 1 backward by exerting a force and shifting the body weight.

The carrier main frame 31 is connected to the crawler drive unit 20 via a power cylinder device 40 serving as a position adjustment device. The power cylinder device 40 is coupled at one end to part of the crawler drive unit 20 and at the other end to a mounting part 31A of the carrier main frame 31 such that it can extend and retract in up and down directions. The relative positions of the carrying unit 30 and the crawler drive unit 20 are adjustable by the position adjustment (extension and retraction) of the power cylinder device 40: The positions are changeable between an intermediate position, where the wheelchair 1 is coupled to and removed from the holding and moving means 33, a stair climbing position where the crawler device travels up and down the stairs with the wheelchair 1 set on the carrying unit 30, and a wheelchair moving position where the wheels 1A of the wheelchair 1 on the carrying unit 30 make contact with the ground and the crawler drive unit 20 is lifted up.

Reference numeral 41 in the drawings denotes a switch box with which the power cylinder device 40 and the motor of the crawler drive unit 20 are operated. A switch 41A is, for example, moved up and down to turn it on and off to extract and retract the power cylinder device 40 in up and down directions, and a switch 41B is moved forward and backward to turn it on and off to move the crawler drive unit 20 forward and backward.

The following is a description of the structure that enables the wheelchair 1 to be set on the wheelchair carrier 10. Female couplers 2 need to be pre-mounted on the wheelchair 1. The female couplers 2 are provided with tubular members 2A mounted horizontally on the left and right sides of the frame or the like in a lower part of the wheelchair 1.

The holding and moving means 33 includes the following: Projecting holders 33A that protrude forward so that they can fit into the tubular members 2A of the female couplers 2, sliders 33B mounted on the carrier main frame 31 such as to be slidable back and forth, the base parts of the projecting holders being pivoted to the distal ends of the sliders 33B, and linkage mechanisms 33C that change the angle of the projecting holders 33A as the sliders 33B slide back and forth. The linkage mechanisms 33C direct the projecting holders 33A horizontally at the front end position of the sliders, and diagonally upwards at the rear end position.

In the base parts of the projecting holders 33A are provided locking mechanisms for retaining the female couplers 2. The locking mechanisms are interlocked with the linkage mechanisms 33C and have locking claws 33D that engage with the tubular members 2A of the female couplers 2 when the projecting holders 33A are directed diagonally upwards and release the tubular members 2A when the projecting holders 33A are horizontal.

Referring now to FIG. 2 and FIG. 3, how the wheelchair 1 is set on the wheelchair carrier 10 will be described. The position of the carrier main frame 31 relative to the crawler drive unit 20 is adjusted in the up and down direction by the extension/retraction of the power cylinder device 40 so that the projecting holders 33A are positioned at the same height as the tubular members 2A of the female couplers 2 on the wheelchair 1. This is achieved simply by turning on the switch 41A, for example. With check means such as a lamp or the like that lights up when the power cylinder device 40 has extended or retracted to a preset intermediate position, the position adjustment can be performed easily.

The wheelchair 1 is moved backwards from the front end of the crawler drive unit 20 so that the wheels 1A will bridge across the crawler drive unit 20, until the projecting holders 33A fit in the tubular members 2A as shown in FIG. 2, whereby the wheelchair 1 is held. The sliders 33B are biased forward by springs, so that the projecting holders 33A always fit in the tubular members 2A at the front end position of the sliders 33B. Since the wheelchair 1 is held on the holding and moving means 33 at a position more forward of the center of gravity of the crawler drive unit 20, wheelchairs having a relatively short front to back length can also be held as described above.

In the state shown in FIG. 2, the wheelchair user reaches backward for levers 32A or the like of the carrying unit 30 and, as the user holds on the levers, the user shifts the body weight so that the wheelchair 1 moves closer to the carrying unit 30. This causes the sliders 33B to move back along guides of the carrier main frame 31 to the rear end position. The projecting holders 33A are turned upward by the function of the linkage mechanisms 33C as noted above, whereby the wheelchair 1 is inclined backward and moved to the wheelchair mounting position on the carrying unit 30, as shown in FIG. 3. That is, the wheelchair 1 is first held on the holding and moving means 33 in the front part of the crawler drive unit 20 and then moved to the wheelchair mounting position in the rear part of the crawler drive unit 20. Thus the wheelchair 1 is set in a position more backward of the center of gravity of the crawler drive unit 20, which is essential for stable transport up or down stairs.

In the state shown in FIG. 3, the wheelchair user operates the levers 32A of the anchor means 32 to secure the backside frame of the wheelchair 1 to the carrier main frame 31. The mechanism of the anchor means 32 will be described later. At the same time, the locking mechanisms operate as shown when the sliders 33B are at the rear end position, and the locking claws 33D engage with the tubular members 2A of the female couplers 2 and securely retain them.

In the state shown in FIG. 2 or FIG. 3, the crawler drive unit 20 is in contact with the ground G. When the power cylinder device 40 is retracted to lower the carrying unit 30 relative to the crawler drive unit 20, the wheels 1A of the wheelchair 1 make contact with the ground and the crawler drive unit 20 is lifted up to make a ground clearance C as shown in FIG. 4. As the carrying unit 30 moves down, the anti-tip wheel 25 comes out from the rear of the crawler drive unit 20 and makes contact with the ground. The wheelchair user can bring the wheelchair carrier 10 into the lower limit position of the power cylinder device 40 (wheelchair moving position) shown in FIG. 4 by operating, for example, the switch 41A, so that the user can move or turn the wheelchair carrier 10 through the driving wheels 1B of the wheelchair 1. That is, the user on the wheelchair can set the wheelchair on the wheelchair carrier 10 to climb up or down stairs, or make a small turn with the wheelchair carrier 10 in a landing all by oneself without any help from anyone.

In the state show in FIG. 4, when the power cylinder device 40 is fully extended, the crawler drive unit 20 takes its stair climbing position, with the wheelchair 1 set on the carrying unit 30. In this state, stopper bosses 33E provided at the rear end of the sliders 33B abut on stopper pins 26 on the crawler drive unit 20 to restrain the sliders 33B from moving forward from the rear end position. The switch box 41 may include a safety device which allows activation of the switch 41B for driving the crawler drive unit 20 only upon detection of the power cylinder device 40 having reached its upper limit position (stair climbing position). This will ensure even safer stair ascent and descent.

Next, various parts of the stair climbing wheelchair carrier 10 of the present invention will be described in greater detail with reference to FIG. 5 to FIG. 8. Same elements are given the same reference numerals in the drawings and description thereof will not be repeated for each of the drawings.

Figure 5:
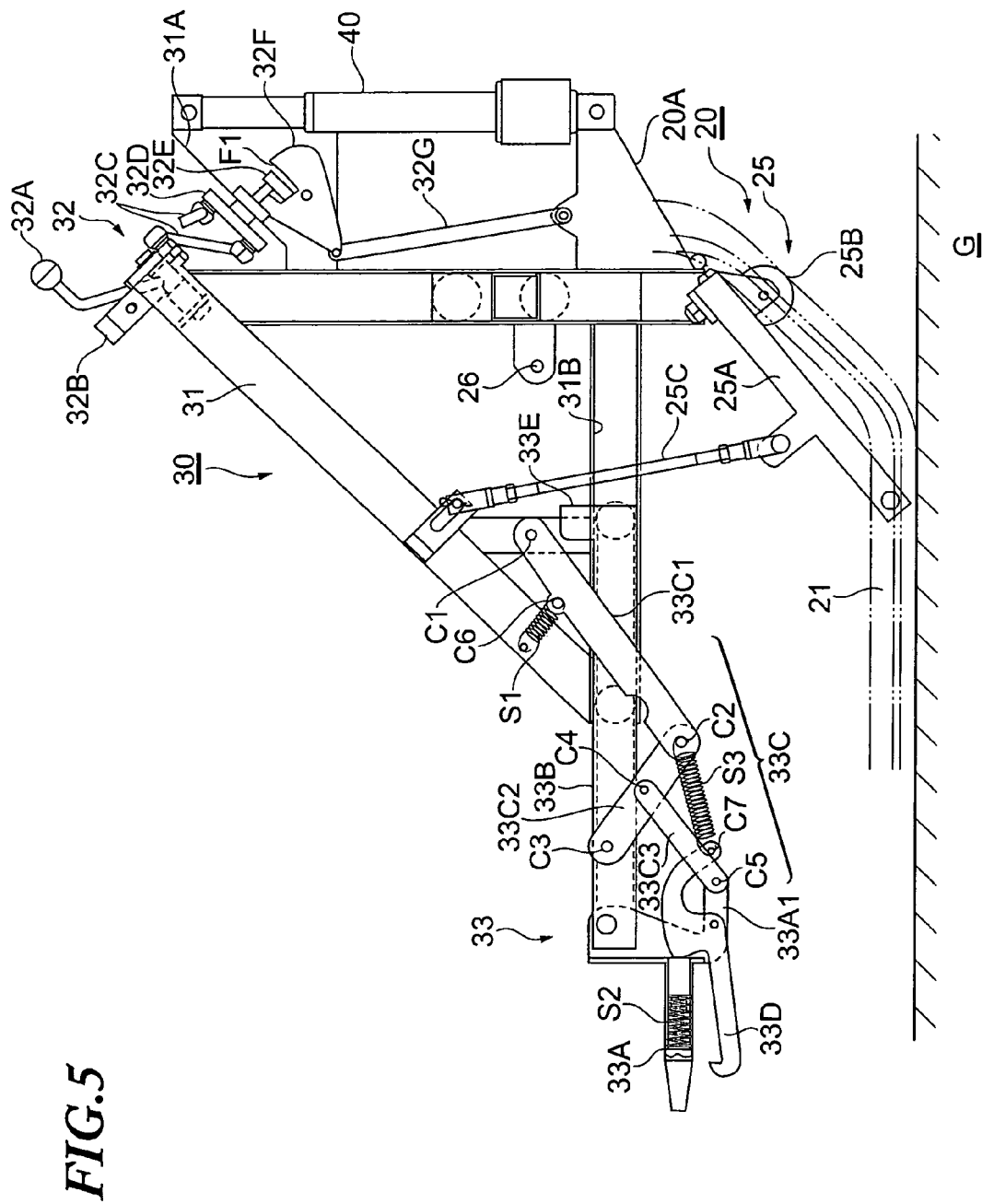
FIG. 5 illustrates part of the stair climbing wheelchair carrier in greater detail.

FIG. 5 illustrates part of the carrier in the same state as that of FIG. 2. The sliders 33B of the holding and moving means 33 are at the front end position, and the carrier main frame 31 and the crawler drive unit 20 are in their intermediate positions where the wheelchair can be coupled to or removed from the holding and moving means 33.

The carrier main frame 31 is mounted on a support member of the crawler drive unit 20 such as to be slidable up and down. A mounting part 31A of the carrier main frame 31 is attached to the upper end of the power cylinder device 40, and a mounting part 20A of the crawler drive unit 20 is attached to the lower end of the power cylinder device 40, so that the relative positions of the carrier main frame 31 and the crawler drive unit 20 are adjustable up and down by extension and retraction of the power cylinder device 40.

The sliders 33B of the holding and moving means 33 are mounted such as to be slidable back and forth along guides 31B in the lower part of the carrier main frame 31.

The linkage mechanisms 33C consist of three links 33C1, 33C2, and 33C3. One end of a first link 33C1 is pivoted to the carrier main frame 31 at a point c1 and the other end is a moving end. One end of a second link 33C2 is pivoted to the moving end of the first link (point c2) and the other end is pivoted to the slider 33B at a point c3. One end of a third link 33C3 is pivoted in the center of the second link 33C2 at a point c4 and the other end is pivoted to a point c5, which is a rotating end of the base part 33A1 of the projecting holder 33A. The first link 33C1 is supported on the carrier main frame 31 by a tension spring S1 at a point c6 on one side. With this spring S1, the slider 33B is biased toward the front end position when it is located forward of the center position, and biased toward the rear end position when it is located backward of the center position.

As the base parts 33A1 of the projecting holders 33A are pivoted to the sliders 33B, the projecting holders 33A are held horizontally when the sliders 33B are at the front end position, and turned upward when the sliders 33B are at the rear end position (see FIG. 6), by the function of the linkage mechanisms 33C.

The projecting holders 33A are thus interlocked with the sliders 33B via the linkage mechanisms 33C so that the angle of the projecting holders is changed with the sliding movement. The reason why the linkage mechanism with three links is used in this embodiment is to provide sufficient slide stroke length to achieve the predetermined angle change of the projecting holders 33A.

The locking mechanism of each projecting holder 33A includes a compression spring S2 arranged axially inside the projecting holder 33A, which provides a repulsive force to keep the locking claw 33D in the lock position. The locking claw 33D is pivoted to the base part 33A1, and its rotating end c7, opposite from the claw, is coupled to the moving ends c2 of the first and second links 33C1 and 33C2 by a tension spring S3. The slider 33B shown in FIG. 5 is at its front end position, where the points c2 and c7 are located away from each other. The tension spring S3 has a larger tensile force than the repulsive force of the compression spring S2, so that the locking claw 33D is kept in the released position.

The anchor means 32 includes retaining claws 32B that clutch the backside frame of the wheelchair for securely holding the wheelchair. The retaining claws 32B are pivoted to the carrier main frame 31 and biased toward the lock position. The retaining claws 32B can be released by operating levers 32A.

Figure 8:
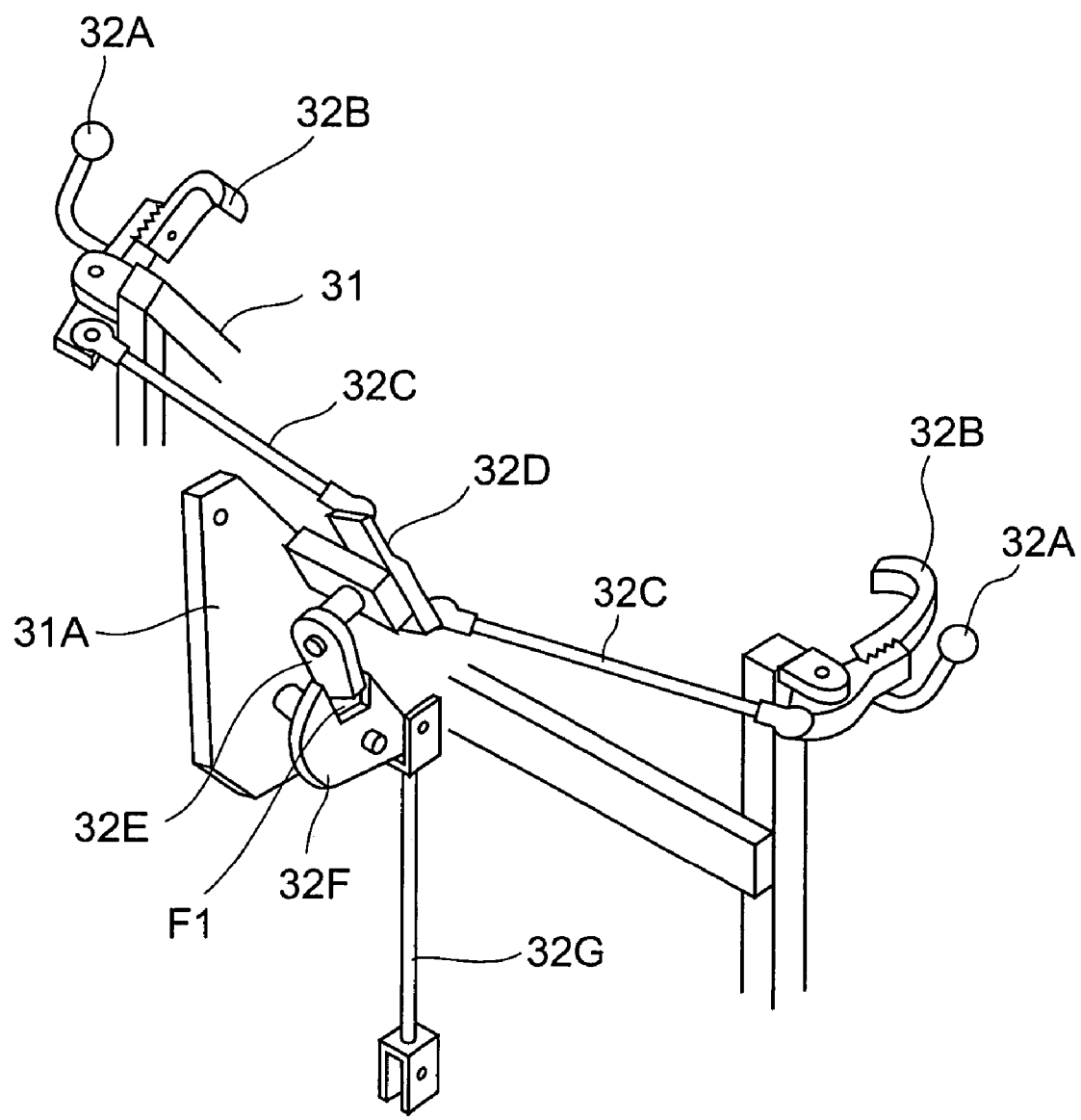
FIG. 8 illustrates part of the stair climbing wheelchair carrier in greater detail.

The anchor means 32 further includes a mechanism that allows the retaining claws to be released only at the intermediate position where the wheelchair 1 is coupled to and removed from the holding and moving means 33. Referring to FIG. 8, this mechanism includes a plate 32D and a cam 32E that are rotated together through a pair of rods 32C coupled to the rotating ends of the retaining claws 32B when the pair of the levers 32A are operated. The mechanism further includes a control plate 32F that rotates with extension and retraction of the power cylinder device 40. The control plate 32F is pivoted to the mounting part 31A of the carrier main frame 31, on which the upper end of the power cylinder device 40 is attached. The rotating end of the control plate 32F is connected to the pivoted end of a rod 32G. The other end of the rod 32G is pivoted to the mounting part 20A of the crawler drive unit 20, on which the lower end of the power cylinder device 40 is attached. The control plate 32F thus rotates with extension and retraction of the power cylinder device 40, and the cam 32E is allowed to rotate through a notch F1 in the control plate 32F only at the intermediate position shown in FIG. 5.

The anti-tip wheel 25 is made up of a wheel support frame 25A, a wheel 25B, and rods 25C. One end of the wheel support frame 25A is pivoted to the guide rails 21 of the crawler drive unit 20, and the wheel 25B is attached to the other end of the frame. The wheel support frame 25A is pivoted in the center to one end of the rods 25C, and the other ends of the rods 25C are pivoted to the carrier main frame 31. Thus, the anti-tip wheel 25 comes out from the rear end of the crawler drive unit 20 when the carrier main frame 31 and the crawler drive unit 20 are at their predetermined heights. In the intermediate position shown in FIG. 5, the wheel 25B is not in contact with the ground.

Figure 6:
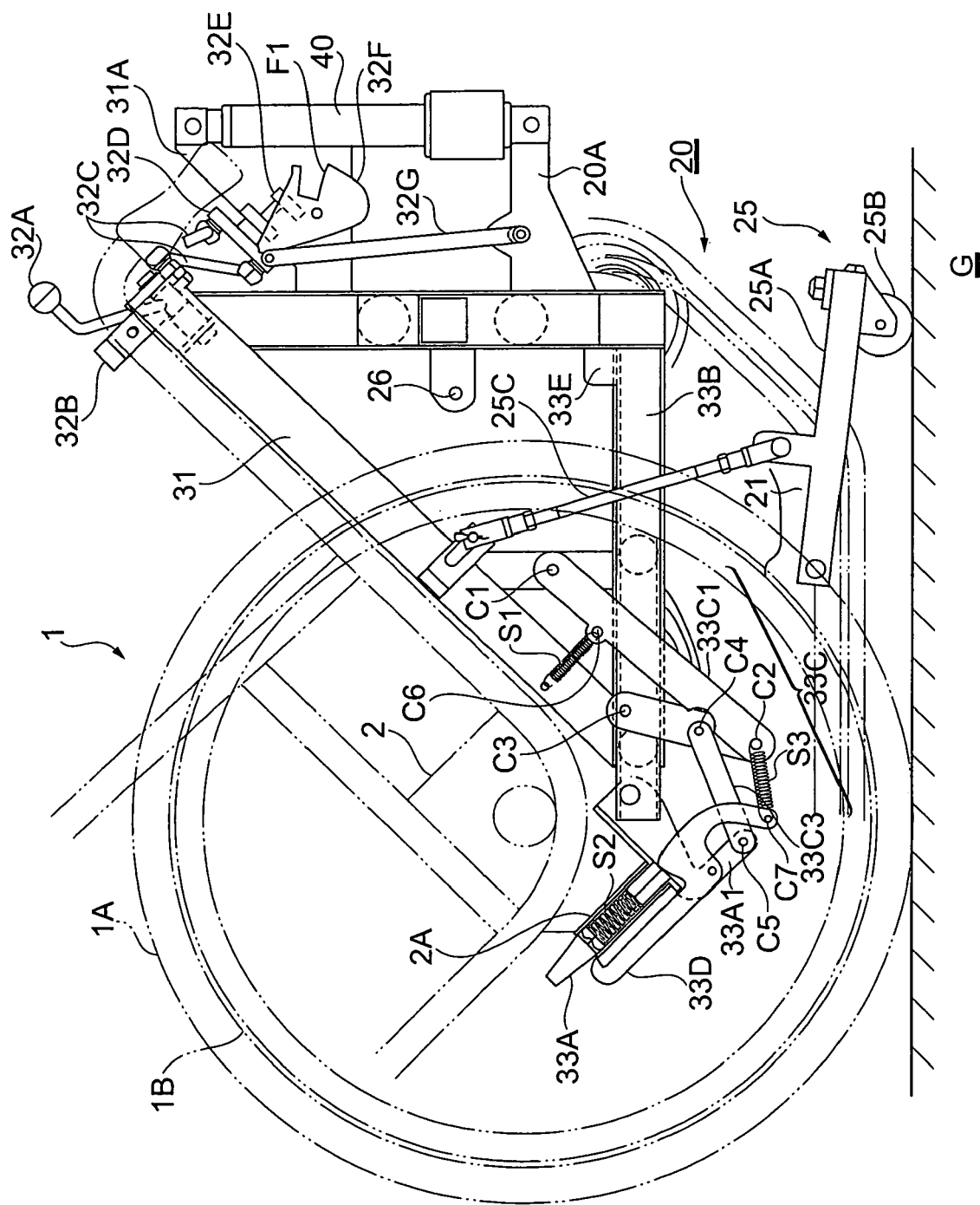
FIG. 6 illustrates part of the stair climbing wheelchair carrier in greater detail.

FIG. 6 illustrates part of the wheelchair carrier in the state shown in FIG. 4 in greater detail. The sliders 33B of the holding and moving means 33 are at the rear end position. The power cylinder device 40 is in the lower limit position, where the carrier main frame 31 and the crawler drive unit 20 are in the wheelchair moving position where the wheels 1A of the wheelchair 1 are in contact with the ground G.

When the sliders 33B slide to the rear end position, the projecting holders 33A are turned upwards by the function of the linkage mechanisms 33C. The rotating ends c7 of the locking claws 33D and the moving ends c2 of the first and second links 33C1 and 33C2 come closer, canceling the tensile force of the springs S3. The locking claws 33D thus engage with the tubular members 2A on the wheelchair 1, in which the projecting holders 33A have fitted, by the repulsive force of the compression springs S2.

As the carrier main frame 31 and the crawler drive unit 20 come closer, the rod 32G rotates the control plate 32F, separating the notch F1 of the control plate 32F from the cam 32E. This inhibits the operation of the anchor means 32 through the levers 32A because the cam 32E cannot rotate.

Also, as the carrier main frame 31 and the crawler drive unit 20 come closer, the rods 25C push the wheel support frame 25A out so that the wheel 25B of the anti-tip wheel 25 makes contact with the ground G.

Figure 7:
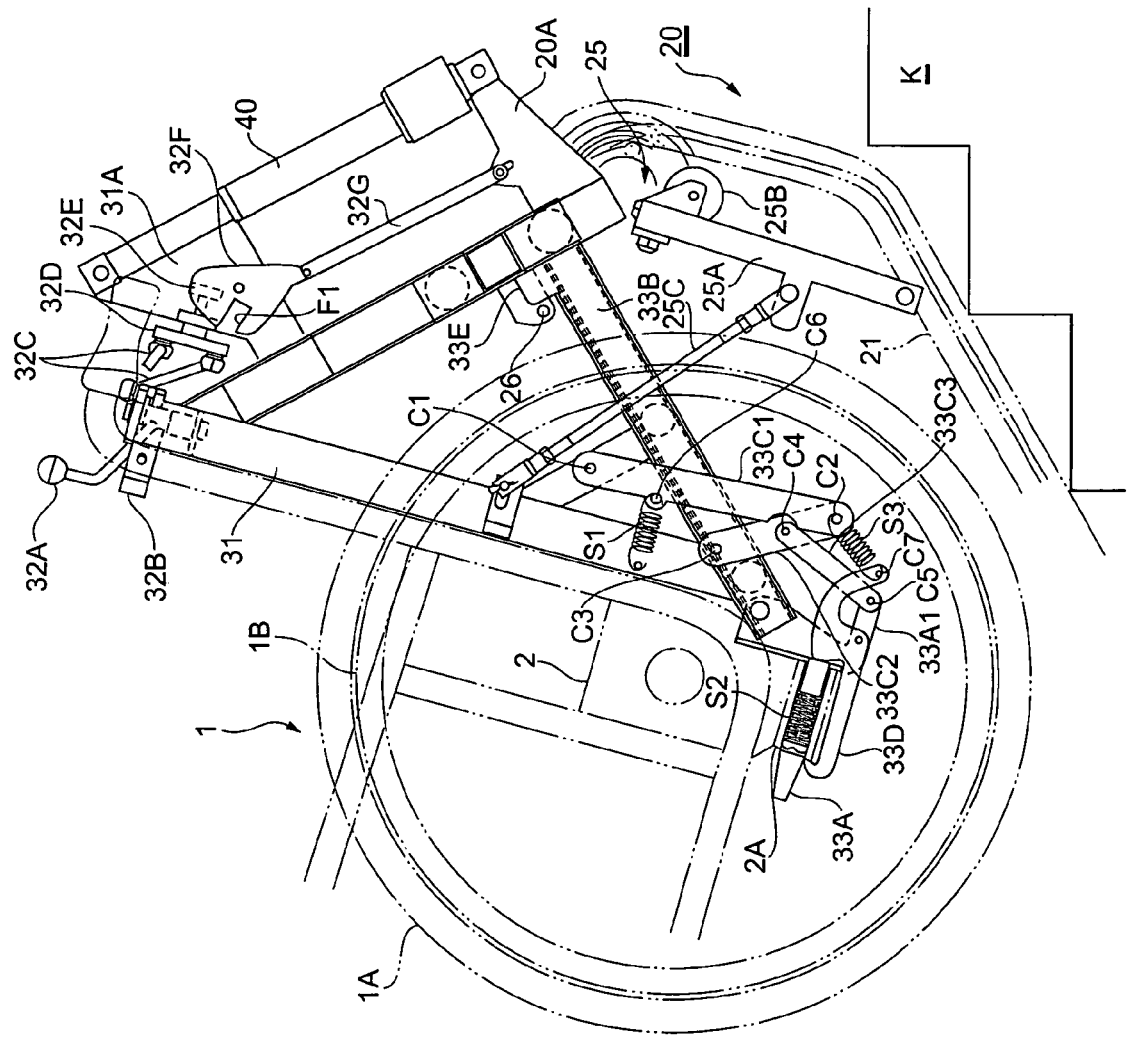
FIG. 7 illustrates part of the stair climbing wheelchair carrier in greater detail.

FIG. 7 illustrates part of the wheelchair carrier in the stair climbing position. This state is achieved by extending the power cylinder device 40 from the state shown in FIG. 6 to its upper limit position so that the carrier main frame 31 and the crawler drive unit 20 are farthest from each other. This causes the crawler drive unit 20 to make contact with the ground, so that the wheelchair 1 on the carrying unit 30 rests on the crawler drive unit 20.

The holding and moving means 33 remains in the state shown in FIG. 6, i.e., the locking claws 33D remain engaged with the tubular members 2A. As the carrier main frame 31 is lifted up relative to the crawler drive unit 20, the stopper bosses 33E at the rear ends of the sliders 33B abut on the stopper pins 26 on the crawler drive unit 20, whereby the sliders 33B are kept at the rear end position and stopped from moving forward.

As the carrier main frame 31 and the crawler drive unit 20 are away from each other, the rod 32G rotates the control plate 32F, separating the notch F1 of the control plate 32F from the cam 32E. This inhibits the operation of the anchor means 32 through the levers 32A because the cam 32E cannot rotate.

Also, as the carrier main frame 31 and the crawler drive unit 20 are away from each other, the rods 25C lift up the wheel support frame 25A so that the wheel 25B of the anti-tip wheel 25 is accommodated in the crawler drive unit 20.

The characteristic features of the stair climbing wheelchair carrier of the present invention are as follows:

First, the carrying unit 30 includes: the carrier main frame 31 whose position is adjustable up and down relative to the crawler drive unit 20; the anchor means 32 for securely holding the back of the wheelchair 1 set in the wheelchair mounting position on the carrier main frame 31; and the holding and moving means 33 for holding the wheelchair 1 on the ground in the front part of the crawler drive unit 20 and for moving the wheelchair 1 to the wheelchair mounting position that is in the rear part of the crawler drive unit 20 as the wheelchair user tilts the wheelchair 1 backward by shifting the body weight.

Since the wheelchair 1 is held in the front part of the crawler drive unit 20 and then moved to the wheelchair mounting position in the back, the wheelchair user can set even a wheelchair with a short front to back length by oneself to the stable wheelchair mounting position, which is in the rear part of the crawler drive unit. The anchor means 32 mounted on the carrier main frame 31 enables secure hold of the wheelchair and safe stair ascent and descent. Furthermore, as the carrier main frame 31 is adjustable up and down relative to the crawler drive unit 20, it can be lowered down after the wheelchair has been mounted, so that the wheelchair 1 can move around on the ground with the wheels 1A. This means that the wheelchair user can move the wheelchair to the set position before climbing up or down stairs, or make a turn in a landing, without any help from anyone.

Second, the carrier main frame 31 is connected to the crawler drive unit 20 via a position adjustment device (power cylinder device 40) so that the relative positions of the carrying unit 30 and the crawler drive unit 20 are changeable through operation of the position adjustment device. They can be positioned in the intermediate position where the wheelchair 1 is coupled to or removed from the holding and moving means 33, the stair climbing position where the crawler drive unit 20 can move up or down stairs with the wheelchair 1 set on the carrying unit 30, and the wheelchair moving position where the wheels of the wheelchair 1 on the carrying unit 30 make contact with the ground and the crawler drive unit 20 is lifted up. In the rear part of the crawler drive unit 20 is installed the retractable anti-tip wheel 25 that comes out with the movement of the position adjustment device and makes contact with the ground when the crawler drive unit 20 is in the wheelchair moving position.

Because the positions of the carrier main frame 31 and the crawler drive unit 20 are adjustable by the position adjustment device, the burden on the unassisted wheelchair user on the carrying unit 30 is reduced, contributing to the better operability of the wheelchair carrier. The wheelchair position can be adjusted in the intermediate position, or changed from the intermediate position to the wheelchair moving position, or from the wheelchair moving position to the stair climbing position, simply by operating the position adjustment device. Also, the anti-tip wheel extends and retracts automatically as it is interlocked with the position adjustment device, whereby it is made sure that the anti-tip wheel makes contact with the ground in the wheelchair moving position.

Third, the use of the power cylinder device 40 which is adjustable in up and down directions enables error free operation of setting the wheelchair carrier position. The upper limit position and the lower limit position of the power cylinder device 40 correspond to the stair climbing position and the wheelchair moving position, respectively.

Fourth, the holding and moving means 33 includes: the projecting holders 33A protruding forward to fit into the female couplers 2 on the wheelchair; the sliders 33B mounted on the carrier main frame 31 such as to be slidable back and forth, the base parts of the projecting holders 33A being pivoted to the distal ends of the sliders 33B; and the linkage mechanisms 33C that change the angle of the projecting holders 33A as the sliders 33B slide back and forth for directing the projecting holders 33A horizontally at the front end position of the sliders, and diagonally upwards at the rear end position.

After the wheelchair 1 is held by the holding and moving means 33, the wheelchair user slides the sliders 33B backward by oneself. This inclines the wheelchair 1 backward by the function of the linkage mechanisms 33C. Thus the wheelchair 1 is held by the holding and moving means 33 and then moved backward as it is tilted back smoothly and easily.

Fifth, the linkage mechanisms 33C consist of three links 33C1, 33C2, and 33C3. One end of the first link 33C1 is pivoted to the carrier main frame 31 and the other end is a moving end. One end of the second link 33C2 is pivoted to the moving end of the first link and the other end is pivoted to the slider 33B. One end of the third link 33C3 is pivoted in the center of the second link 33C2 and the other end is pivoted to the rotating end of the base part of the projecting holder 33A.

Thus the projecting holders 33A are interlocked with the sliders 33B by the linkage mechanisms 33C consisting of three links so that the angle of the projecting holders 33A is changed with the sliding movement. This way, the sliders 33B can have a sufficient slide stroke length to achieve the predetermined angle change of the projecting holders 33A, and even a wheelchair 1 having a short front to back length can be held and moved backward by the holding and moving means.

Sixth, the projecting holders 33A are provided with the locking mechanisms for retaining the female couplers 2 of the wheelchair. The locking mechanisms have the locking claws 33D which engage with the female couplers 2 when the projecting holders 33A are directed diagonally upwards and release the female couplers 2 when the projecting holders 33A are horizontal.

When the female couplers 2 on the wheelchair 1 are to be coupled onto the projecting holders 33A, the locking claws 33D are freed from the female couplers 2, so that the projecting holders 33A can smoothly fit into the female couplers 2. When the wheelchair 1 held on the carrier is moved backward and tilted back, the locking claws 33D automatically engage with and retain the female couplers 2, whereby the wheelchair 1 mounted on the carrying unit 30 is prevented from falling.

Seventh, when the carrying unit 30 and the crawler drive unit 20 are in their stair climbing positions, the sliders 33B are retained at the rear end position and cannot move forward. That is, a situation is avoided in which the sliders 33B move forward during transport on stairs, which will release the locking mechanisms, whereby safe stair travel is assured.

Eighth, the anchor means 32 has a mechanism that allows release thereof only when the carrying unit 30 and the crawler drive unit 20 are in their intermediate positions. That is, a situation is avoided in which the anchor means 32 is accidentally released, whereby safe stair travel is assured.

While there has been described what are at present considered to be preferred embodiments of the present invention, it will be understood that various modifications may be made thereto, and it is intended that the appended claims cover all such modifications as fall within the true spirit and scope of the present invention.

What is claimed is:

1. A stair climbing wheelchair carrier comprising:
    a crawler drive unit with a motor-driven crawler device that travels up and down stairs; and
    a carrying unit on which a front-facing wheelchair is mounted in a tilted back position,
    wherein said carrying unit includes:
    a carrier main frame whose position is adjustable up and down relative to said crawler drive unit;
    anchor means for securely holding a back of said wheelchair set in a wheelchair mounting position on said carrier main frame; and
    holding and moving means for holding said wheelchair on a ground in a front part of said crawler drive unit and for moving the wheelchair to said wheelchair mounting position that is in a rear part of said crawler drive unit as said wheelchair is tilted backward, and
    wherein the holding and moving means includes:
        a projecting holder protruding forward to fit into a female coupler on the wheelchair;
        a slider mounted on said carrier main frame such as to be slidable back and forth, a base part of said projecting holder being pivoted at a distal end of the slider; and
        a linkage mechanism that changes an angle of said projecting holder as said slider slides back and forth for directing said projecting holder horizontally at a front end position of the slider, and diagonally upwards at a rear end position.

2. The stair climbing wheelchair carrier according to claim 1, wherein:
    said carrier main frame is connected to said crawler drive unit via a position adjustment device;
    relative positions of said carrying unit and said crawler drive unit are changeable through operation of said position adjustment device, so that they can be positioned in an intermediate position where said wheelchair is coupled to and removed from said holding and moving means, a stair climbing position where said crawler drive unit can travel up or down stairs with the wheelchair set on said carrying unit, and a wheelchair moving position where wheels of the wheelchair on said carrying unit make contact with the ground and said crawler drive unit is lifted up; and
    an anti-tip wheel is installed in the rear part of said crawler drive unit, the anti-tip wheel extending and retracting with the movement of said position adjustment device and making contact with the ground when said crawler drive unit is in said wheelchair moving position.

3. The stair climbing wheelchair carrier according to claim 2, wherein:
    said position adjustment device is a power cylinder device that can extend and retract in up and down directions; and
    an upper limit position and a lower limit position of said power cylinder device correspond to said stair climbing position and said wheelchair moving position, respectively.

4. The stair climbing wheelchair carrier according to claim 1, wherein
    the linkage mechanism includes:
        a first link unit having an end which is pivoted to said carrier main frame and the other end of which is a moving end;
        a second link unit having an end which is pivoted to said moving end of the first link unit and the other end which is pivoted to said slider; and
        a third link unit having an end which is pivoted in the center of said second link unit and the other end of which is pivoted to a rotating end of a base part of said projecting holder.

5. The stair climbing wheelchair according to claim 1, wherein:
    said projecting holder is provided with a locking mechanism for retaining said female coupler on the wheelchair; and
    said locking mechanism has a locking claw which engages with said female coupler when said projecting holder is directed diagonally upwards and releases said female coupler when said projecting holder is horizontal.

6. The stair climbing wheelchair carrier according to claim 1, wherein
    when said carrying unit and said crawler drive unit are in their stair climbing positions, the slider is retained in its rear end position and cannot move forward.

7. The stair climbing wheelchair carrier according to claim 2, wherein
    said anchor means has a mechanism that allows release thereof only when said carrying unit and said crawler drive unit are in their intermediate positions.

* * * * *